United States Patent
Ringeval

(10) Patent No.: US 12,400,496 B2
(45) Date of Patent: Aug. 26, 2025

(54) OR RELATING TO STORAGE OF ACCELEROMETER DATA

(71) Applicant: VEONEER SWEDEN AB, Vargarda (SE)

(72) Inventor: Frederic Ringeval, Vargarda (SE)

(73) Assignee: VEONEER SWEDEN SAFETY SYSTEMS AB, Stockholm (SE)

( * ) Notice: Subject to any disclaimer, the term of this patent is extended or adjusted under 35 U.S.C. 154(b) by 0 days.

(21) Appl. No.: 17/426,171

(22) PCT Filed: Jan. 14, 2020

(86) PCT No.: PCT/GB2020/050068
§ 371 (c)(1),
(2) Date: Jul. 28, 2021

(87) PCT Pub. No.: WO2020/161464
PCT Pub. Date: Aug. 13, 2020

(65) Prior Publication Data
US 2022/0101660 A1    Mar. 31, 2022

(30) Foreign Application Priority Data
Feb. 7, 2019   (EP) ..................................... 19156053

(51) Int. Cl.
*G07C 5/08* (2006.01)
*G01P 1/12* (2006.01)
(Continued)

(52) U.S. Cl.
CPC .............. *G07C 5/085* (2013.01); *G01P 1/127* (2013.01); *G01P 15/00* (2013.01); *G07C 5/10* (2013.01)

(58) Field of Classification Search
CPC .......... G07C 5/085; G07C 5/10; G01P 1/127; G01P 15/00
See application file for complete search history.

(56) References Cited

U.S. PATENT DOCUMENTS

| 5,446,659 | A | 8/1995 | Yamawaki |
| 6,205,391 | B1 * | 3/2001 | Ghoneim ............... B60T 8/1755 701/79 |

(Continued)

FOREIGN PATENT DOCUMENTS

| IN | 20172102023 A | * | 1/2018 |
| JP | H0954889 A | | 2/1997 |

(Continued)

OTHER PUBLICATIONS

Machine translation of KR101058155B! (Year: 2011).*
(Continued)

*Primary Examiner* — Lee E Rodak
*Assistant Examiner* — Sangkyung Lee
(74) *Attorney, Agent, or Firm* — DICKINSON WRIGHT PLLC

(57) ABSTRACT

A method of storing data relating to a parameter of a vehicle, wherein the data is provided by a vehicle sensor. The method includes the steps of: receiving, at time intervals, a series of first and second values from the vehicle sensor. The method further includes steps of processing the first and second values in a manner to reduce the processor requirements and memory for processing the first and second values.

14 Claims, 8 Drawing Sheets

(51) Int. Cl.
 *G01P 15/00* (2006.01)
 *G07C 5/10* (2006.01)

(56) References Cited

U.S. PATENT DOCUMENTS

| | | | |
|---|---|---|---|
| 6,728,613 | B2 | 4/2004 | Ishizaki et al. |
| 7,324,900 | B2 | 1/2008 | Knueppel et al. |
| 8,467,929 | B2 | 6/2013 | Bechtler et al. |
| 8,874,306 | B2 | 10/2014 | Klier et al. |
| 8,935,037 | B2 * | 1/2015 | Bechtler ................ B62D 5/049 701/29.2 |
| 2003/0114985 | A1 | 6/2003 | Ishizaki et al. |
| 2004/0061500 | A1 * | 4/2004 | Lou .................. B62D 15/0245 324/332 |
| 2004/0158376 | A1 | 8/2004 | Knueppel et al. |
| 2011/0066319 | A1 | 3/2011 | Bechtler et al. |
| 2012/0259506 | A1 | 10/2012 | Klier et al. |
| 2019/0020645 | A1 * | 1/2019 | Penny ................. G06F 21/725 |
| 2019/0251764 | A1 * | 8/2019 | Wang ................. G06F 16/2282 |

FOREIGN PATENT DOCUMENTS

| | | | |
|---|---|---|---|
| JP | H127508 | A * | 1/1999 |
| JP | H11272508 | A * | 10/1999 |
| JP | 2001241975 | A | 9/2001 |
| JP | 2003075465 | A | 3/2003 |
| JP | 2017133854 | A | 8/2017 |
| JP | 2018151228 | A | 9/2018 |
| KR | 101058155 | B1 * | 9/2011 |
| WO | WO-2017029381 | A1 * | 2/2017 |

OTHER PUBLICATIONS

Machine translation of JPH127508A (Year: 1999).*
Machine translation of IN20172102023A (Year: 2018).*
Machine translation of JPH11272508A (Year: 1999).*
International Search Report and Written Opinion of PCT/GB2020/050068, mailed Apr. 6, 2020.
Office Action regarding corresponding CN App. No. 202080008104.0; issued Dec. 15, 2023.

* cited by examiner

OR RELATING TO STORAGE OF ACCELEROMETER DATA

CROSS-REFERENCE TO RELATED APPLICATIONS

This application is a 35 U.S.C. § 371 national phase of PCT International Application No. PCT/GB2020/050068, filed Jan. 14, 2020, which claims the benefit of priority under 35 U.S.C. § 119 to European Patent Application No. 19156053.1, filed Feb. 7, 2019, the contents of which are incorporated herein by reference in their entirety.

FIELD OF THE INVENTION

This invention relates to the storage of accelerometer data in vehicles, and is particularly concerned with storing accelerometer data efficiently.

BACKGROUND

Many modern vehicles include sensors such as accelerometers. After an event such as a crash, it is often useful to be able to review the signals that were provided by these sensors before, during and after the event, so that certain aspects of the event can be recreated. This may allow, for example, a determination as to whether safety systems such as air-bags, which are activated based on signals from the vehicle's sensors, were triggered correctly, or triggered at the correct time.

For this reason, some vehicles will start to record the signals produced by certain vehicle sensors once it has been determined that a vehicle impact or rollover event such as a crash is taking place. However, signals recorded in this way will not provide a complete picture, as the signals generated before the event began to occur will not be captured.

It has therefore been proposed to hold in memory, at all times, a record of the signals produced by the sensors for a period of time immediately preceding the present moment. This period of time may be, for example, 2 seconds. When an event such as a crash occurs, this data can be retained, and the signals from the sensors as the event continues can also be recorded. Using this technique, therefore, following an event, an investigator should be able to retrieve a record of sensor signals throughout the event, starting from 2 seconds before the event began.

While this technique is advantageous, it does require that the vehicle includes a memory in which 2 seconds of sensor data (i.e., at any given moment, the data relating to the immediately-preceding 2 seconds) are always held. This may be a relatively large quantity of data.

It is an object of the present invention to seek to provide an improved system of this kind.

SUMMARY

Accordingly, one aspect of the present invention provides a method of storing data relating to a parameter of a vehicle, wherein the data is provided by a vehicle sensor, the method including the steps of: receiving, at time intervals, a series of first and second values from the vehicle sensor, wherein each first value represents a parameter that is sensed by the vehicle sensor, and each second value relates to the functioning of the vehicle sensor; for each new first value that is received: (a) comparing the new first value to the immediately preceding first value that was received; (b) if the difference between the new first value and the immediately preceding first value is below a difference threshold, storing the difference in a memory; or (c) if the difference between the new first value and the immediately preceding first value is above a difference threshold, storing the new first value in the memory, maintaining a counter recording the number of consecutive second values that have been received that have had the same value; and for each new second value that is received: (a) comparing the new second value to the immediately preceding second value that was received; (b) if the new second value is the same as the immediately preceding second value, incrementing the counter; or (c) if the new second value is different from the immediately preceding second value, recording the immediately preceding second value in the memory, along with the current counter value, and then resetting the counter; and (d) if the counter has reached a counter threshold value, recording the new second value in the memory, along with the counter threshold value, and resetting the counter.

Advantageously, the step of storing the difference between the new first value and the immediately preceding first value includes storing a data word having a first length; the step of storing the new first value includes storing a data word having a second length; and the first length is less than the second length.

Preferably, the step of storing the new first value includes storing a data word including one or more bits that indicate that the data word includes a first value.

Conveniently, the step of storing the difference between the new first value and the immediately preceding first value includes storing a data word including one or more bits that indicate that the data word includes a difference between two consecutive first values.

Advantageously, the one or more bits include a header which appears at the start of the data word.

Preferably, the one or more bits is a single bit.

Conveniently, the method further includes the step of recording timestamp data indicating the time at which the data relating to the parameter of the vehicle has been stored.

Advantageously, the method further includes the step of recording separate timestamp data in connection with the first values and in connection with the second values.

Preferably, the method further includes the steps of: recording timestamp data at periodic intervals in connection with the second values; and if, following an interval since the recording of the previous timestamp data, the counter is in the course of incrementing, waiting until data relating to the second values is recorded before recording timestamp data in connection with the second values.

Conveniently, the method includes the steps of: receiving from the vehicle sensor a data package including the new first value and the new second value; and separating the new first value and the new second value.

Advantageously, recording the immediately preceding second value in the memory, along with the current counter value, includes storing a data word in the memory including the immediately preceding second value and the current counter value; and wherein recording the new second value in the memory, along with the counter threshold value, includes storing a data word in the memory including the new second value and the counter threshold value.

Another aspect of the invention provides a method having the steps of: recording first and second values in the memory of a vehicle in accordance with any of the above, to store first and second values relating to a set time period immediately preceding a present moment, and over-writing first and second values relating to times which are more than the set time period before the present moment.

A further aspect of the invention provides a computer program product including computer program code operable to cause a computer to perform all of the steps of any of the above when the code is run on a computer.

Another aspect of the invention provides a computer readable medium storing computer program code according to the above.

A further aspect of the invention provides a vehicle having a vehicle sensor which, in use, generates a series of first and second values from the vehicle sensor, wherein each first value represents a parameter that is sensed by the vehicle sensor, and each second value relates to the functioning of the vehicle sensor, wherein the first and second values are transmitted from the vehicle sensor to a vehicle processor, and stored in a memory of the vehicle in accordance with any one of the above.

Advantageously, the series of first and second values includes a series of linked first and second values, in which, within each linked first and second value, the first value represents a parameter that is sensed by the vehicle sensor, and the second value relates to the functioning of the vehicle sensor at the time of sensing the parameter to generate the first value.

Preferably, the sensor is an accelerometer, and preferably wherein the vehicle includes a plurality of sensors, wherein the data from each of the sensors is stored in the memory in accordance with any one of the above.

BRIEF DESCRIPTION OF THE DRAWINGS

In order that the invention may be more readily understood, embodiments thereof will now be described, with reference to the accompanying drawings, in which.

DETAILED DESCRIPTION

A modern vehicle may include an accelerometer which produces, every 250 μs, an acceleration value and a validity flag.

The acceleration value may typically take the form of a 10 bit signed word, having a range between −512 and +511.

The validity flag may be a single bit, i.e. either 0 or 1. The validity flag indicates whether the data provided by the sensor is reliable, e.g. that the sensor has not become disconnected, as can sometimes occur during a crash. If an acceleration value is accompanied by a validity flag value that indicates that the data is reliable, then the acceleration value will be used or considered by an investigator. However, if an acceleration value is accompanied by a validity flag value that indicates that the data is not reliable, this acceleration value will not be used or considered by an investigator. The investigator may apply a backup strategy, for instance considering signals that were produced by other sensors at the same time.

If there are eight sensors of this kind in a vehicle, the minimum required bandwidth is $$8 \times (10+1) \text{ bits}/(250 \text{ μs}) = 352 \text{ kbit/s} = 44 \text{ ko/s}$$

If, as discussed above, data from all of the sensors is retained for a period of 2 seconds, then the required memory (such as RAM) to store this information is 88 ko.

As the skilled reader will be aware, RAM is relatively expensive, and this therefore represents a costly parameter when choosing a microcontroller for a vehicle.

Embodiments of the invention may reduce the quantity of storage that is required to hold this data.

The inventors have noted that, under normal circumstances, acceleration values typically do not change quickly. In addition, the validity flag will typically be "true" or "false" for fairly long sequences of samples, will not alternate between consecutive samples.

The quantity of data that is to be stored can therefore be reduced by, instead of storing the values received at each sampling time, storing the difference (or data representing the difference) between a current sample and the previous sample.

Figure 1:
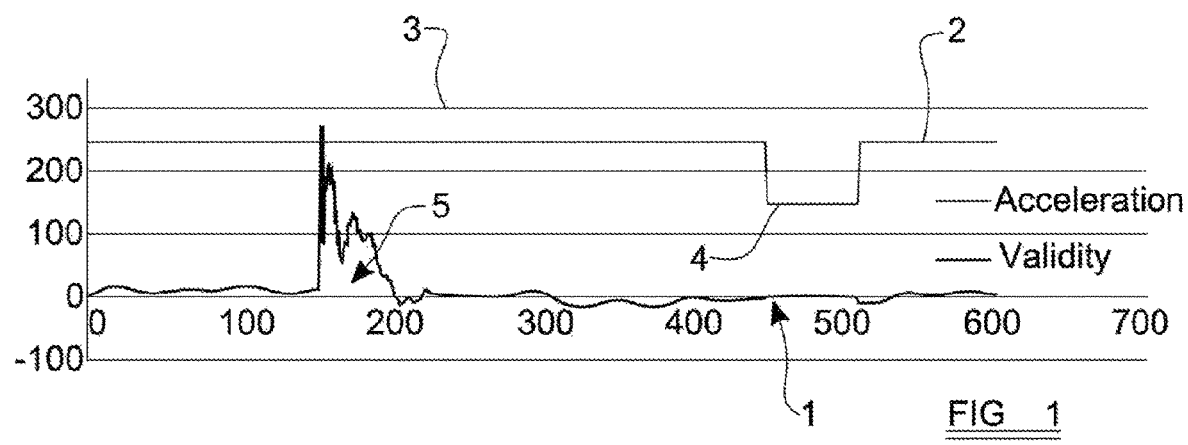
FIG. 1 shows a graph of acceleration and data validity against time.

FIG. 1 is a schematic representation of the acceleration 1 that may be sensed by an accelerometer during a crash event, with respect to time. In this figure, the acceleration 1 has a value which is close to zero for most of the time that is represented, but has considerably higher values for a part of the time (indicated by reference numeral 5) during which an impact event takes place.

FIG. 1 also shows, on the same timescale, the value 2 of the validity flag relating to this sensor. As can be seen in FIG. 1, the validity flag takes only two values, a relatively high value 3 (representing a "true" signal, or an indication that the data from the sensor is reliable) and a relatively low value 4 (representing a "false" signal, or an indication that the data from the sensor is not reliable).

Figure 2:
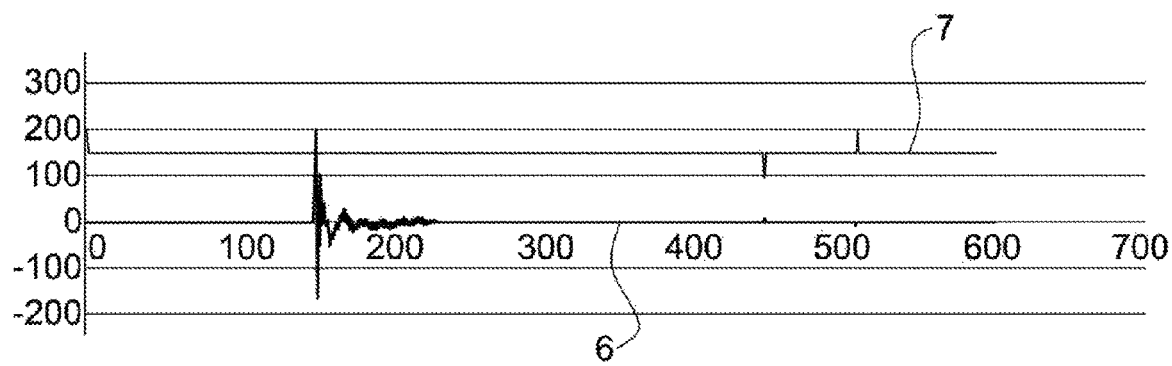
FIG. 2 shows the change in acceleration and data validity against time, for the data shown in FIG. 1.

FIG. 2 shows a graph including a line 6 which shows, at each plotted point, the difference in acceleration compared to the previous plotted point.

It can be seen that, outside the region representing the impact event, this line 6 changes relatively little, and lies almost entirely between the values −4 and +3.

FIG. 2 also includes a line 7 which shows, at each plotted point, the difference in the value of the validity flag compared to the previous plotted point. In the scale of this graph, the value occupied by this line 7 over the majority of the graph corresponds to zero.

It can be seen that this line 7 is almost constant.

A scheme for encoding this data, in accordance with an embodiment of the invention, is described below.

For the values of acceleration, if the difference between the value of a sample and the value of the immediately preceding sample is below a predetermined threshold, then the difference itself is stored for that sample. In preferred embodiments, this data is stored along with a header which indicates that the following value is a difference (or delta value).

Alternatively, if the difference between the value of a sample and the value of the immediately preceding sample is above the predetermined threshold, then the value of the sensed acceleration is stored for that sample. In preferred embodiments, this data is stored along with a header which indicates that the following value is a direct sensor value (rather than a delta value).

In the example of the data shown in FIGS. 1 and 2, storing the data in this manner would require 2228 bits, for the delta values, and 484 bits for the sensed values. A total of 2712 bits are therefore needed.

By contrast, if all of the direct sensor values had been stored, as is the case for conventional systems, 6010 bits would have been required. The scheme described above therefore allows for 221% storage efficiency for the acceleration values, or a compression ratio of 2.2.

For the values of the validity flag, when the validity flag changes value, it is proposed to store date recording the number of samples immediately before this for which the validity flag had retained the same value. In preferred embodiments, a count is maintained of the number of samples for which the validity flag retains the same value. If the validity flag retains the same value for a predetermined number of samples, an entry is stored in the memory to record this, and the count is restarted. For example, if the validity flag retains the same value for 127 samples, an entry may be stored in the memory recording this.

Referring again to the data shown in FIG. 1, this technique could require 3×8 bits, to store the initial long, unchanged part of the data, 8 bits to store the negative pulse and a further 8 bits to store the last part of the data following the negative pulse. This means that a total of 40 bits is needed. By contrast, if the validity flag had been recorded in the conventional manner for each sample, this would have required 601 bits. In this example, for the validity flag this technique therefore allows for 1502% storage efficiency, or a compression ratio of 15.

Combining the figures given above for both the acceleration values and the validity flag, a total of 2752 bits are needed using the scheme according to the invention, compared to a total of 6611 bits needed using the conventional approach. This therefore allows an overall storage efficiency of 240%, or a compression ratio of 2.4.

FIGS. 3 to 23 show a representation of the storage of data using this technique.

Figure 3:
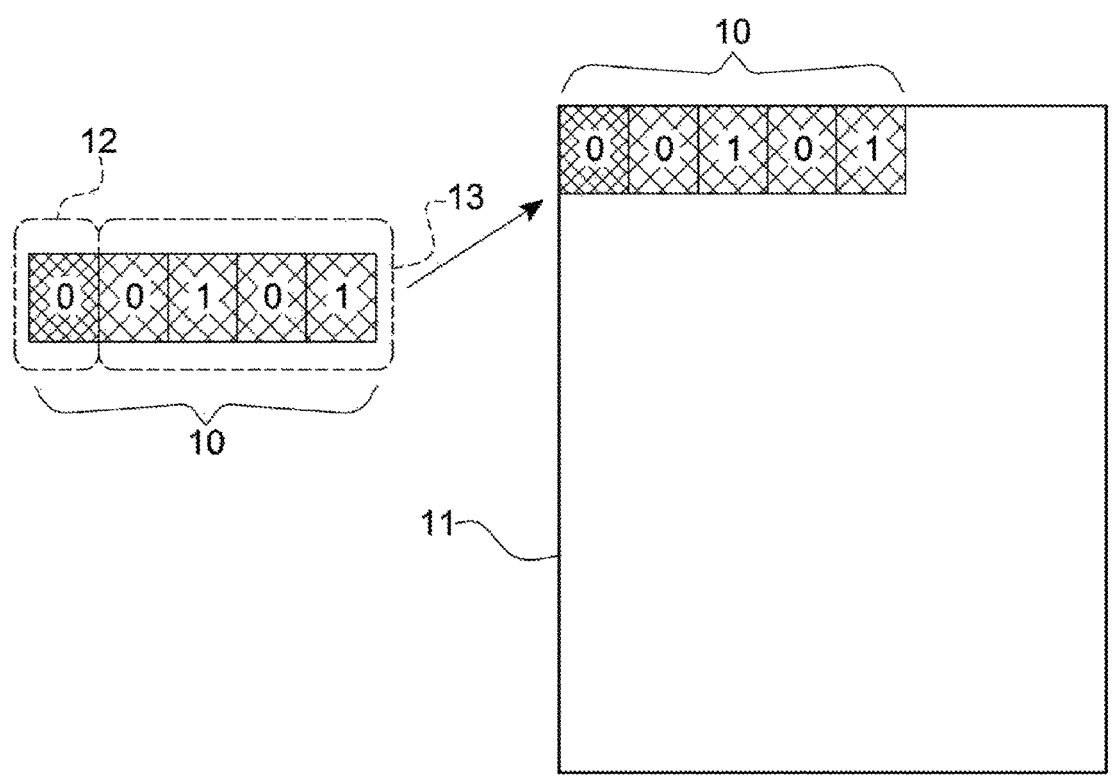
FIGS. 3 to 7 show stages in the encoding of acceleration data.

With reference firstly to acceleration, FIG. 3 shows that a value of 5 is received in a particular sample. The previous acceleration value was 0, and so this gives a delta value of 5. This is below the threshold, and so (as described above) the delta value will be stored. FIG. 3 shows that the data 10 stored in the memory 11 include a header bit 12, which indicates that the data that follows is a delta value. In this example, a header value of 0 is used to signify that the data that follows is a delta value, although any other suitable scheme may be used. The data 10 stored in the memory 11 also includes 4 bits 13 encoding the delta value itself.

Figure 4:
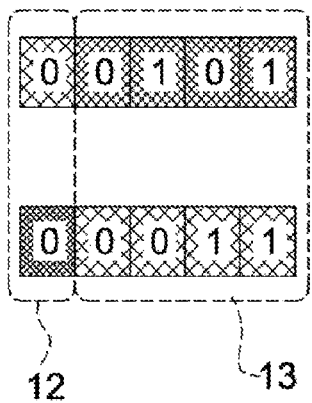
Figure 4:
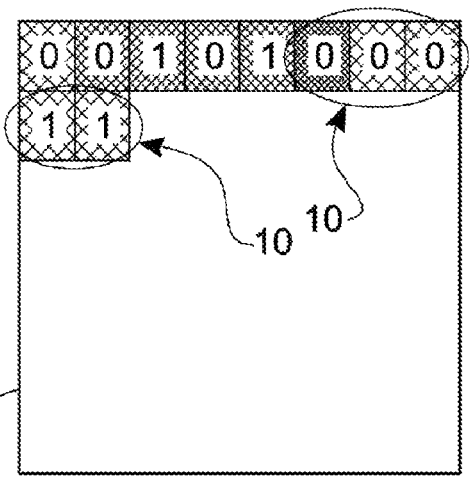

Turning to FIG. 4, a new value of 8 is received in a next sample. The difference between this sample and the previous value is 3, which is once again below the threshold, and so this difference is stored as a delta value. FIG. 4 once again shows that the data 10 to be stored in the memory 11 includes a header bit 12 (which is once again 0) and four bits 13 encoding the delta value. In FIG. 4 it can be seen that two delta values are now stored in the memory 11.

Figure 5:
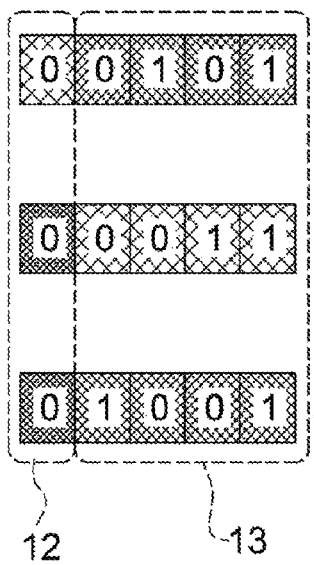
Figure 5:
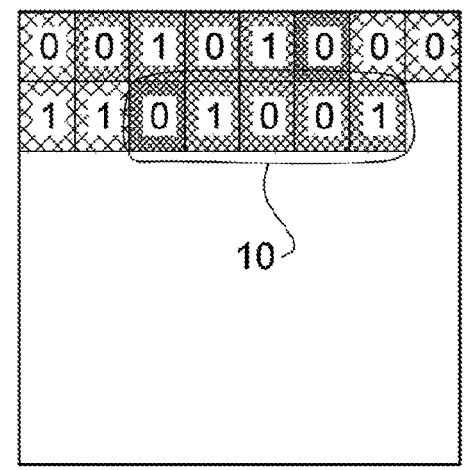

FIG. 5 shows a new sample, with value 1, being received. The new difference is −7, which is again stored in the memory 11 as a header bit 12 and four data bits 13.

Figure 6:
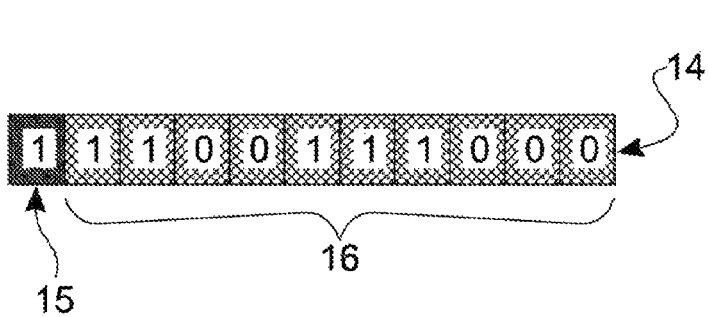
Figure 6:
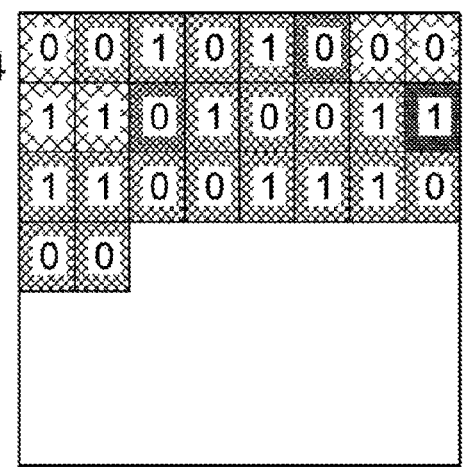

FIG. 6 shows that a new sample is received, which has a value of −200. The difference is therefore −201, and this is above the threshold. Instead of being stored as a delta value, therefore, this sample is stored as a direct sensor value. As can be seen in FIG. 6, the data 14 to be stored in the memory 11 includes a header bit 15, which indicates that the data that follows is a direct sensor value (in this example, a header bit of 1 is used to signify that the data that follows is a direct sensor value). The data 14 to be stored in the memory 11 also includes 10 data bits 16, encoding the direct sensor value itself. This data 14 is stored in the memory 11 along with the previously-stored data, as described above.

Figure 7:
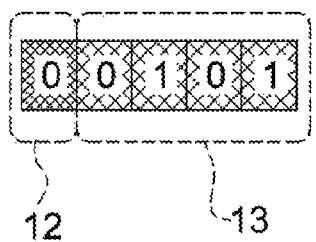
Figure 7:
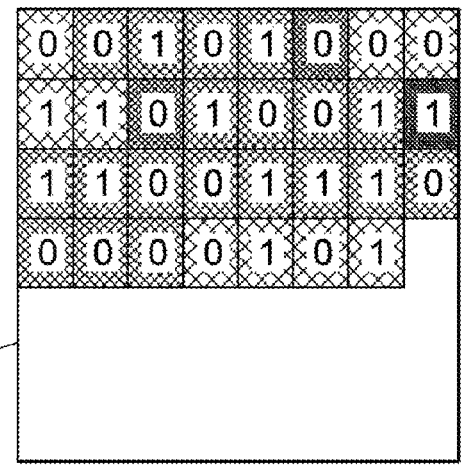

With reference to FIG. 7, in the next sample the value of acceleration is −195. The difference between this and the previous sample is therefore 5, which is below the threshold and is stored as a delta value, having a single header bit 12 and four data bits 13.

Figure 8:
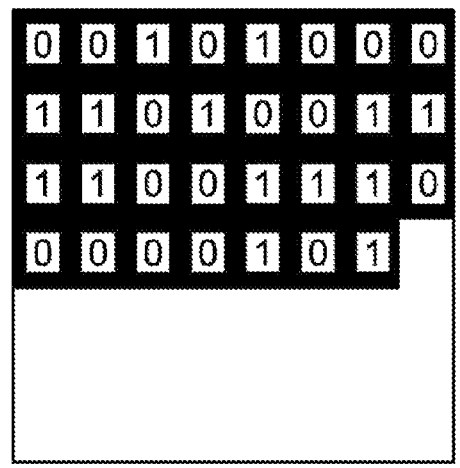
FIGS. 8 to 14 show stages in the decoding of the acceleration data.

FIG. 8 shows the data that has been stored in the memory 11. One possible process for decompressing this data, to restore the original information, will now be shown.

Figure 9:
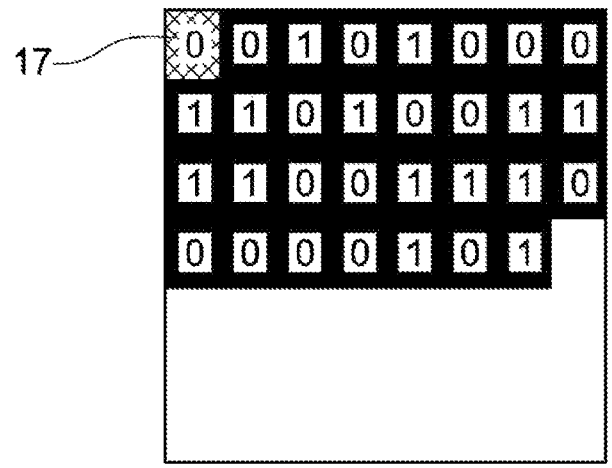
Figure 10:
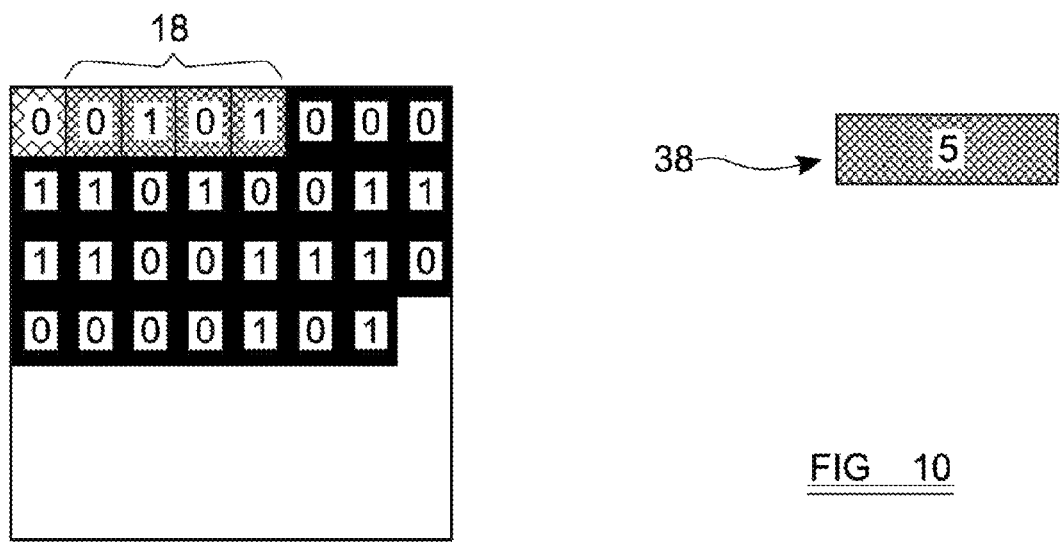

As can be seen in FIG. 9, a first bit 17 of the stored information is analysed. Since this first bit 17 is a 0, this signifies that the following four digits will be data representing a data value. These next four digits 18 are read, as shown in FIG. 10. Since the previous value of acceleration is known to be zero, a new value 38 (encoded by these five bits 17, 18, can be determined to be 5.

Figure 11:
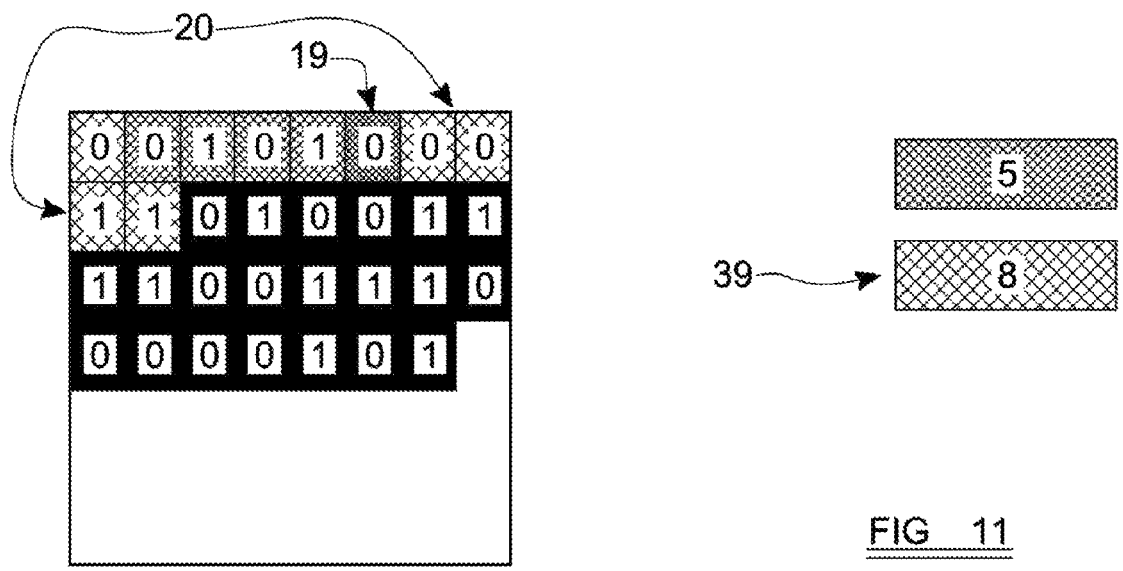
Figure 12:
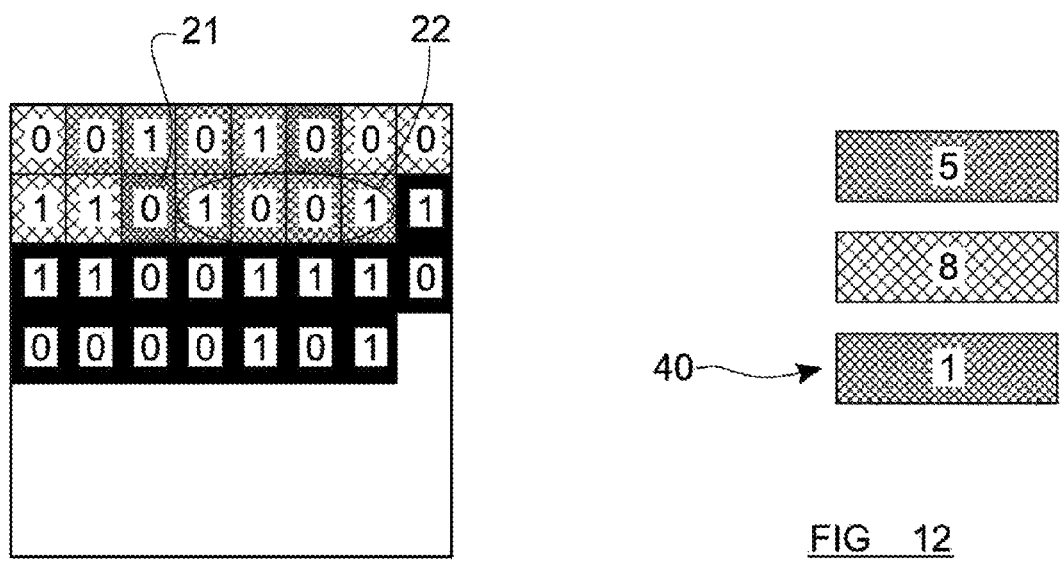

In FIG. 11, a next bit 19 is read, and once again this is zero, indicating that the next four bits 20 will encode a delta value. These four bits 20 are read, allowing a determination that the delta value encoded by these bits 20 is 3. This is added to the previous sample value (i.e. 5) to reach a new value 39 of 8.

In FIG. 12, again a next bit 21 is read. This is zero, indicating that the next four bits 22 will encode a delta value. These four bits 22 are read, and the value thereof added to the previous sample, allowing a determination that the value 40 encoded by these next five bits 21, 22 is 1.

Figure 13:
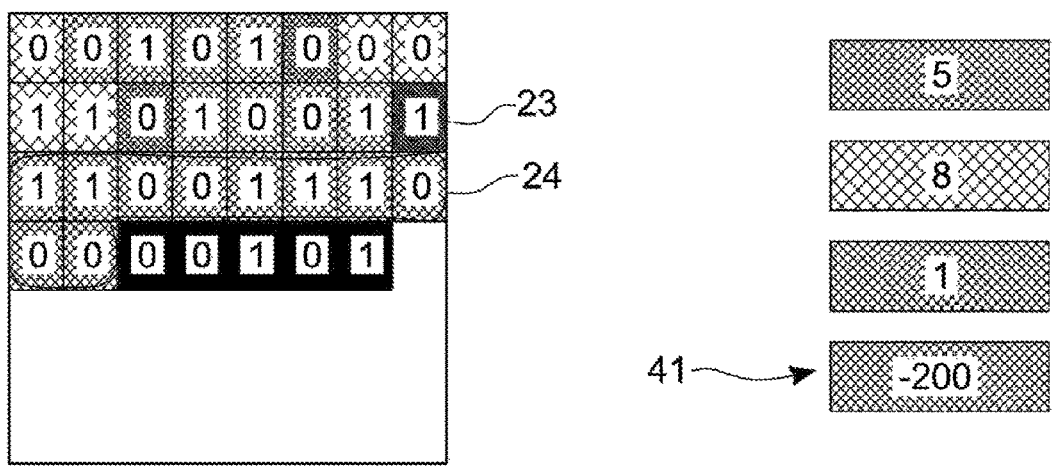

In FIG. 13, a next single bit 23 is read. This bit 23 is a 1, indicating that the immediately following ten bits 24 will encode a sensed value of acceleration. These next ten bits 24 are then read, to give a determination that the new sample 41 has a value of −200 (since this is a direct sensor value, no account is taken here of the previous sample value).

Figure 14:
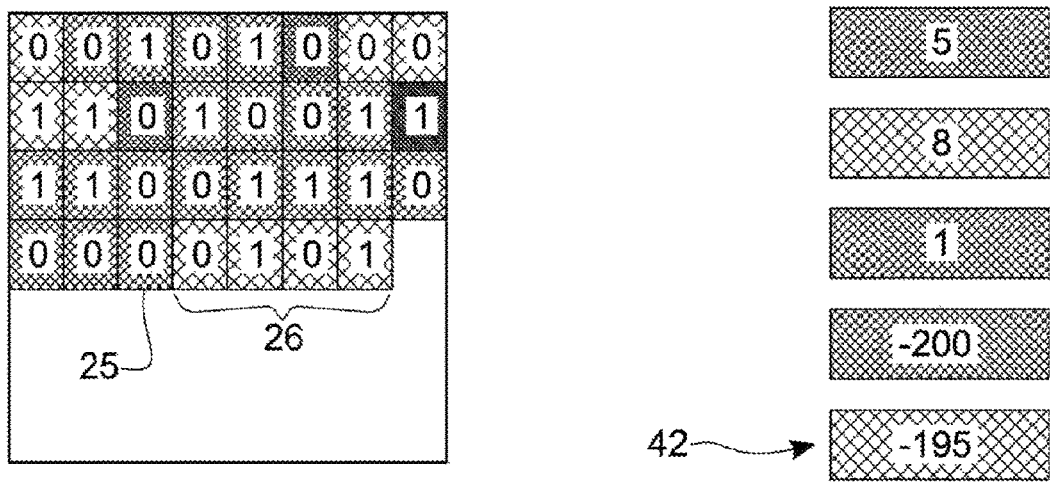

Finally, with reference to FIG. 14, the next single bit 25 is read, and found to have a value of 0. This signifies that the following four bits 26 will encode a delta value. These bits 26 are read, and the delta value of 5 encoded thereby is added to the previous sample value of −200, to give a new sample value 42 of −195.

The skilled reader will readily understand how this scheme allows the original sample values to be recovered from the compressed data in a straightforward manner.

Storage of the validity flag values will now be described.

Figure 15:
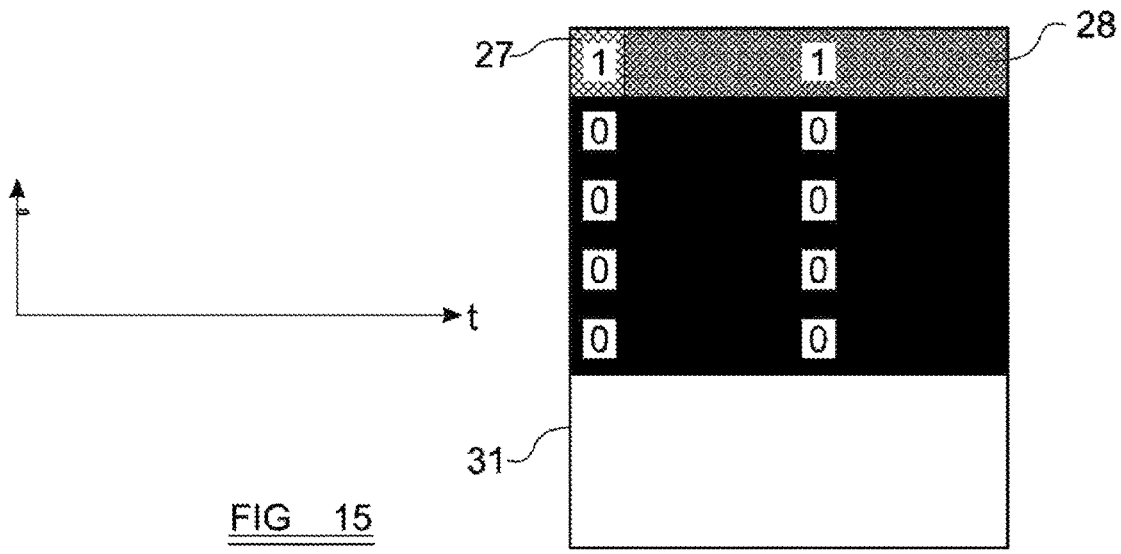
FIGS. 15 to 23 show stages in the encoding of validity data.

FIG. 15, and the subsequent figures, include (on the left hand side) a graph schematically showing the validity data, and (on the right hand side) a representation of the data being recorded into memory.

With reference firstly to FIG. 15, a first validity flag value 27 of 1 is received. A counter 28 records the number of samples for which the value of the validity flag has remained the same. At this stage, the counter 28 has a value of 1 (i.e. this is the first value to be received).

Figure 16:
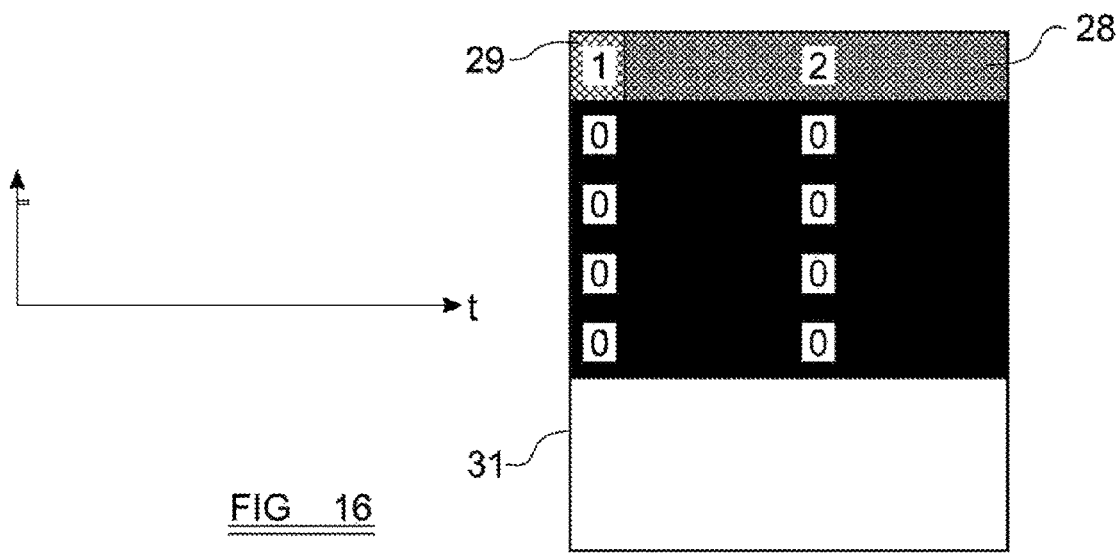
Figure 17:
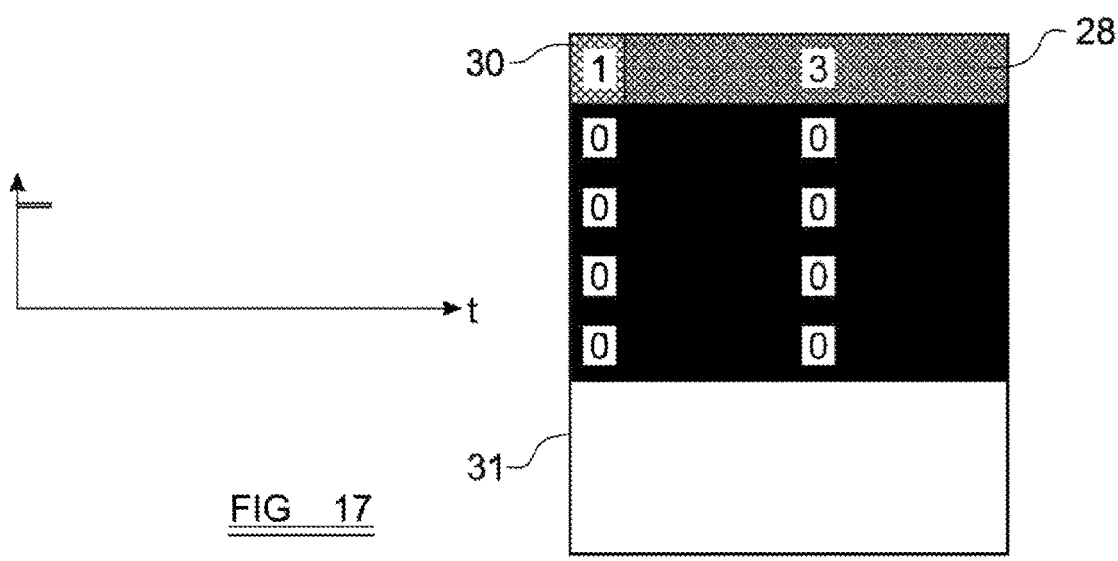

Turning to FIG. 16, a second validity flag value 29 is received. Once again this is 1, and so the counter 28 increments by 1 to 2. Similarly, as shown in FIG. 17, the next validity flag value 30 is 1, and the counter 28 increments by 1 to 3.

Figure 18:
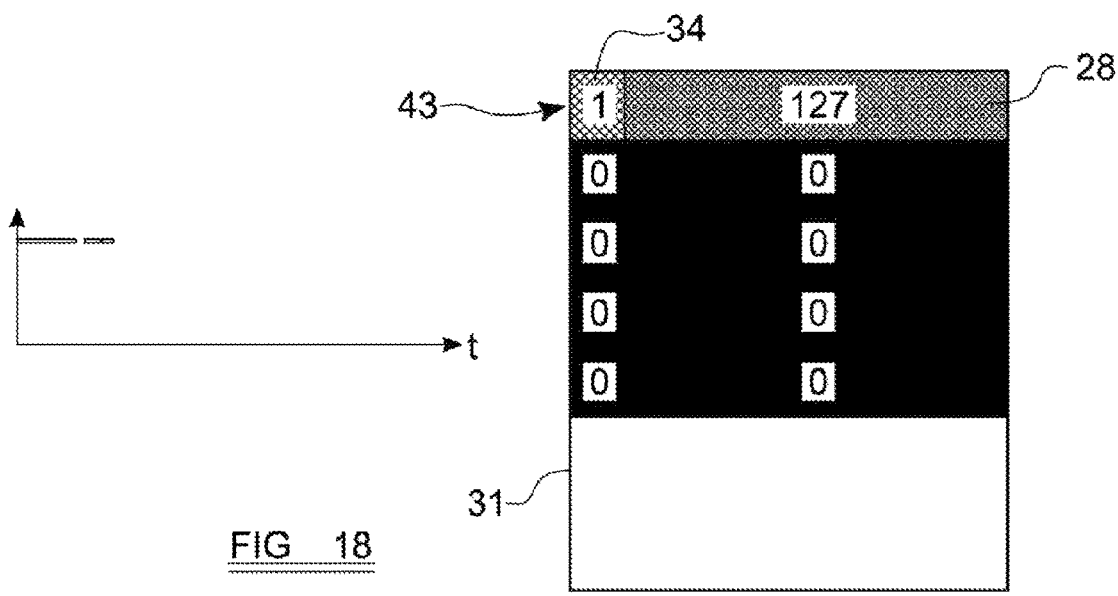

Subsequent validity flag values are received, which also each have a value of 1, until 127 consecutive validity flag values have been 1. The resulting situation is shown in FIG. 18, in which the counter 28 has incremented to 127. At this stage, as discussed above, the counter value (127) is recorded in the memory 31, along with a flag value 34, representing the value that the validity flag during those increments of the counter. As can be seen in FIG. 18, this storage of data is represented by a first line 43 in the memory 31, which includes the flag value 34 and the counter value, representing the fact that the validity flag remained at 1 for 127 samples.

Figure 19:
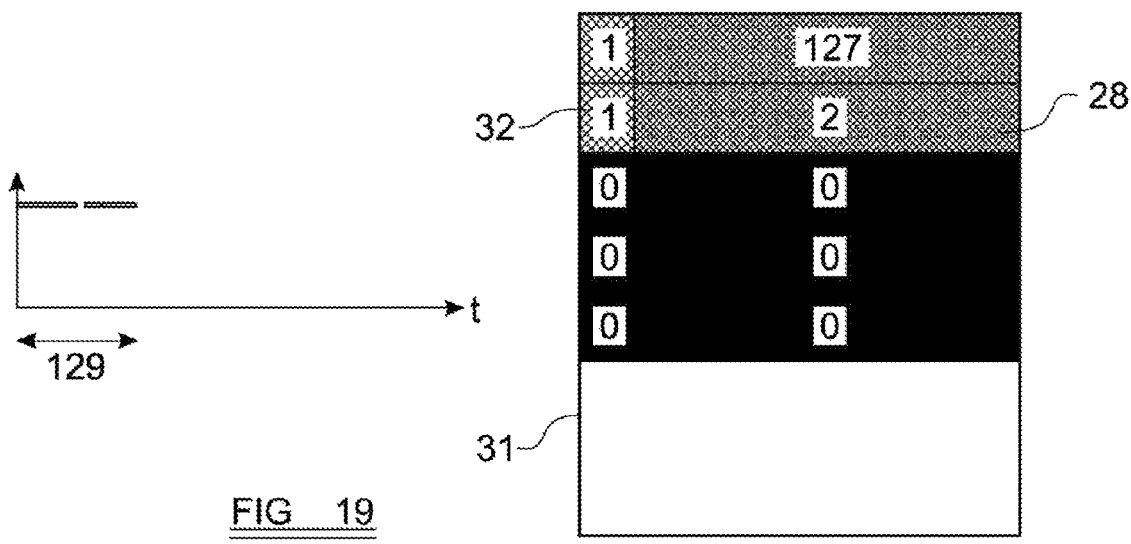

When a next validity flag value, which is again 1, is received the counter 28 increments to 1. A further validity flag value 32 of 1 causes the counter 28 to increment to 2, as shown in FIG. 19.

Figure 20:
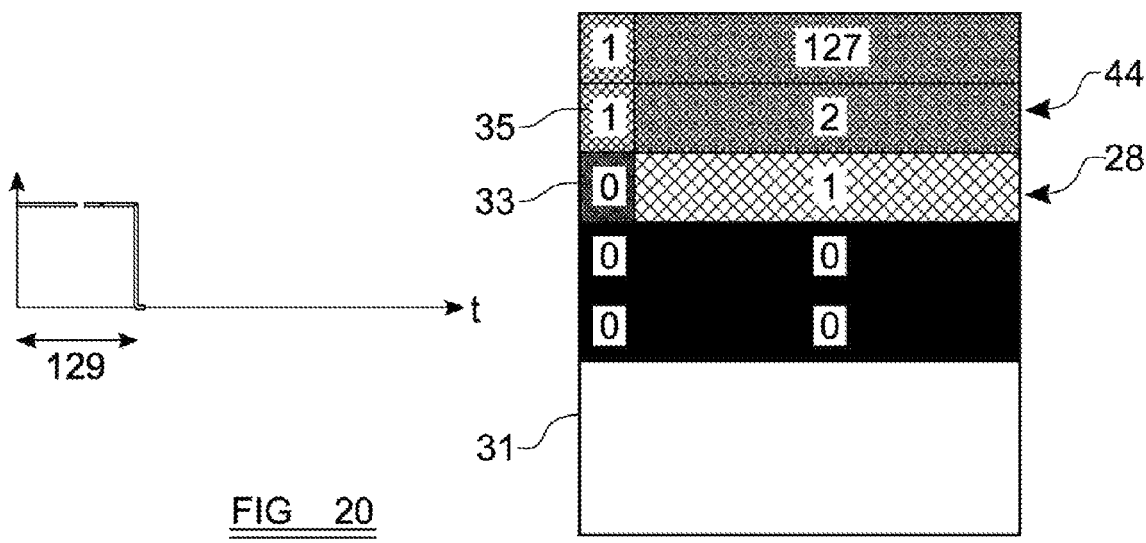

Turning to FIG. 20, the next validity flag value 33 is 0, i.e. the value of the validity flag has changed since the previous sample. The existing value of the counter 28 (i.e. 2) is stored in the memory, along with the flag value 35 corresponding to that counter value, i.e. 1. This is represented in FIG. 20 by the second line 44 in the memory 31. The counter 28 is reset, and increments to 1.

Figure 21:
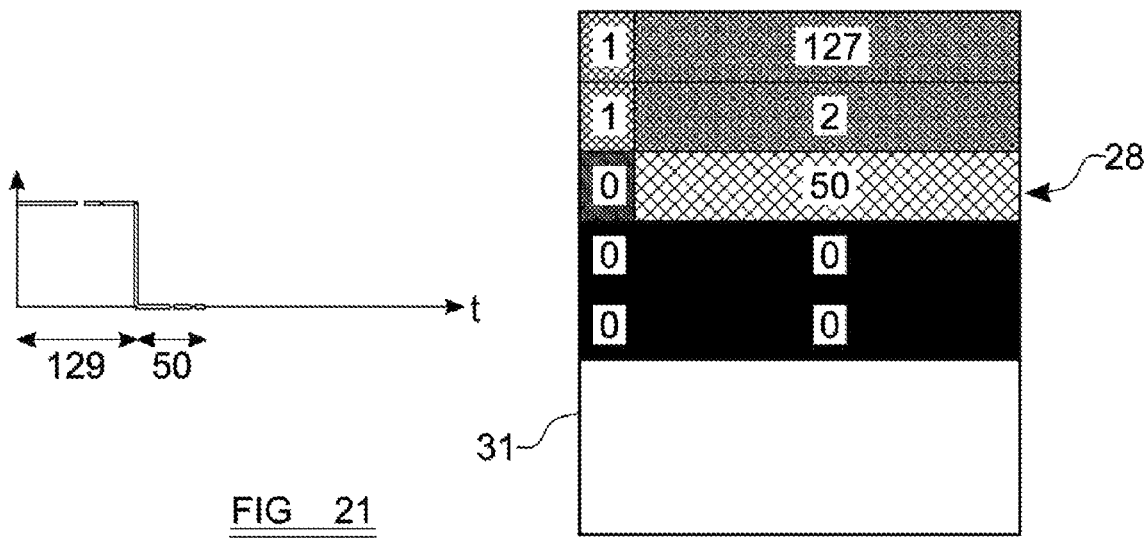
Figure 22:
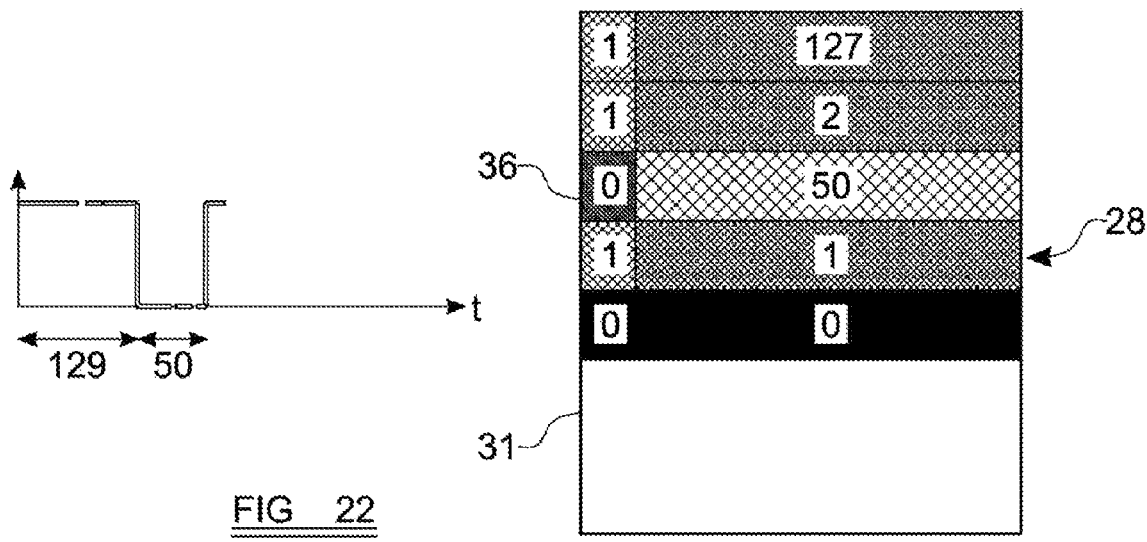

As shown in FIG. 21, 49 further consecutive samples are received, each with a validity flag value of 0. As a result the counter 28 increments to 50. In the next sample (represented by FIG. 22) the validity counter has a value of 1, i.e. is different to the value in the previous sample, and so the counter value of 50 is stored in the memory 31, along with a flag value 36 of 0, representing the fact that the validity flag was 0 for 50 consecutive samples. The counter 28 is reset, and increments to 1.

Figure 23:
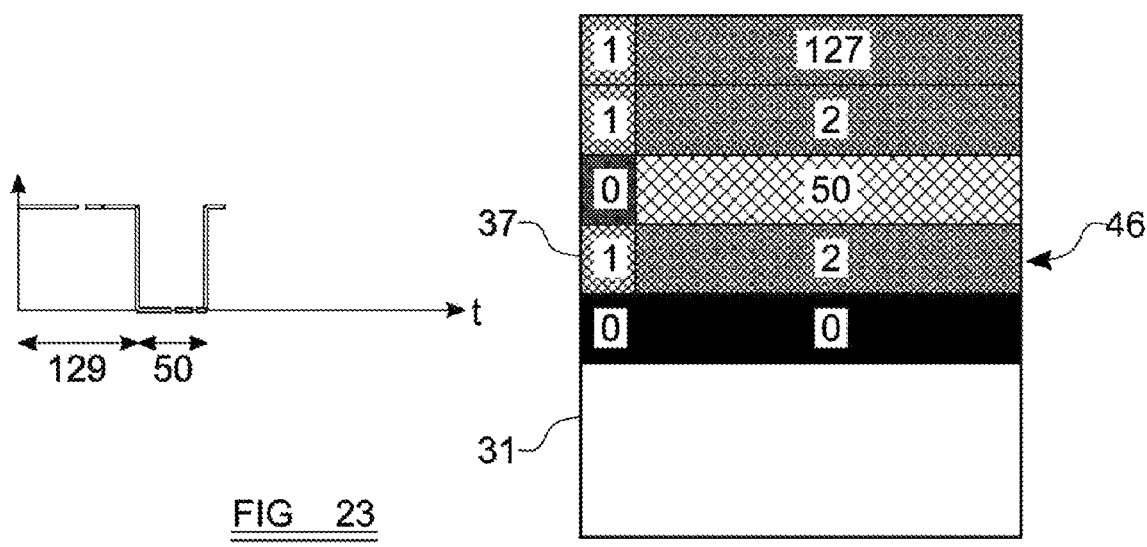

As shown in FIG. 23, the next (and final) sample value provides a validity flag value of 1 and the counter 28 increments to 2. As this is the end of the data, the counter value of 2 is stored as a final line 46 in the memory 31, along with a flag value 37 of 1, indicating that the validity flag had a value of 1 for 2 separate samples.

The decompression of this data will be straightforward, as the skilled reader will appreciate. To reconstruct the original data represented by each line stored in the memory, the flag value in that line is repeated a number of times corresponding to the counter value in that line. For instance, the first line 43 has a flag value 34 of 1, and a counter value of 127. This first line 43 therefore represents 127 consecutive values of 1.

The decompression of the remaining lines in this example will be clear to the skilled reader.

In the discussion above, if the flag value remains the same for 127 consecutive samples, this is recorded in the memory, and the counter is reset. However, a greater or lesser threshold value could be used. In the example given above, a new value will be received every 250 μs, and so 127 samples will be received in around 0.03 s. New "lines" in the memory will therefore be recorded every 0.03 s or more (depending on whether the flag value changes or not over the time in question). In this example the aim is to record 2 s of activity in the vehicle's memory at all times, and with this in mind the system could also use a higher threshold count value, to record entries in the memory less frequently, and thus achieving greater compression while still reliably recording the relevant activity in the vehicle's memory.

It is anticipated that the validity flag value will change relatively seldom. In practice, the validity flag may have three values: "not available", when no data is received from the sensor, "valid", when the sensor is working correctly, and "failed", when the sensor is not considered to be working correctly, and the signals from the sensor therefore will not be trusted (or will be subjected to further analysis before any reliance is placed on them).

In a preferred scheme, when the vehicle's electronic control unit (ECU) is turned on, the flag will have the value "not available", until signals begin to be received from the sensor, when the value will change to either "valid" or "failed", and cannot revert back to "not available". There will therefore be no toggling of the value involving the "not available" status.

The value is expected to be "valid" for most (or indeed almost all) of the time the sensor is used. If the value changes to "failed", it is likely to take a relatively long time (from at least several hundreds of microseconds to a few seconds) for the value to change back to "valid". There is therefore also not expected to be any rapid toggling between the "valid" and "failed" statuses.

In view of this it is anticipated that the writing of the validity flag values in accordance with the invention will achieve a high degree of compression.

In use of a system embodying the present invention, signals received from one or more vehicle sensors (in particular, accelerometers) and compressed, using a method embodying the present invention, and stored in a memory of the vehicle, as discussed above. The system will be required to store data representing a certain time period immediately preceding the present moment (at any time), for instance 2 s. Data corresponding to time which is more than 2 s in the past will preferably be deleted, and will more preferably be over-written by new data representing more recent sensor readings.

It is anticipated that, when compressed data is written to the memory in embodiments of the invention, timestamp information is periodically also written to the memory, in conjunction with the compressed sensor values, to indicate the time at which the sensor values were obtained. If an investigator analyses the data, for instance following a crash, this time stamp information will allow the accelerometer and validity flag data to be allocated correct time values, and also to be correlated with each other, so that the investigator can fully reconstruct the compressed signals at a later stage.

A time stamp may, as the skilled reader will understand, include a header indicating that the information that follows indicates a time, followed by a string of digits which encode a time.

Time stamps are preferably included as seldom as practical, to minimise the total amount of data which needs to be encoded.

In one example, time stamp information may be written to the memory at periodic intervals, such as every 1 s or every 2 s, so that every 2 s window contains at least one time stamp. Data in the memory can then be decompressed and analysed based on the times given by the time stamps. These time periods are merely examples, and time stamp information may be included at any suitable intervals.

In preferred embodiments, time stamp information is written to the memory in such a way that it interferes as little as possible with the compression of the data.

For the accelerometer data, a new value is written to the memory every time a signal is received from the accelerometer (whether this is a difference or a new direct sensor value), and so timestamp information can be included between any two values that are written to the memory. Time stamp information can be written at periodic time intervals, or following a certain number of values being written to the memory (or following any other suitable scheme).

However, for the validity flag, data may be written to the memory only when there is a change in the status of the validity flag, or when a count limit is reached. If a time stamp is written to the memory while the status of the validity flag is constant, and part-way through a count, this would disrupt the efficient encoding of data to the memory. For the validity flag, therefore, at intervals the system may attempt to write a time stamp to the memory (for example, following a certain length of time since the last data stamp, or following the writing of a certain number of data values since the last data stamp). If the system is in the course of performing a count of identical validity flag values, the system will wait until validity flag data is written to the memory (either because the validity flag value changes, or because the count limit is reached). A time stamp will then be written to the memory, following this validity flag data.

When the data is decompressed, for instance following a crash, the acceleration data and the validity flag data are each converted into a series of consecutive data values, i.e. reconstructing the original data that was compressed. By making use of the time stamp(s) included in the data sequences, each of the data values can be associated with a time, being the time at which the data value was originally generated or received.

Once this has been done, pairs of acceleration data values and validity flag data values, that were originally generated or received at the same time (or at substantially the same time) can be linked together, to produce a full set of acceleration data values which are accompanied by corresponding validity flag values.

It is anticipated that the data will be written to one or more memories, and a data controller will identify data that is older than a preset threshold (as discussed herein, this threshold may be 2 s) to be deleted and/or over-written by newer data. This preferably occurs on a "rolling" basis, i.e. with older data sensor data in a region of memory being continually over-written by newer sensor data.

In preferred embodiments a region of memory is set aside for the storage of the sensor data, in normal operation (i.e. to store a rolling window of data when the vehicle is not involved, and does not appear likely to be involved, in a crash). The size of the region of memory set aside may be calculated based on a conservative estimate of how much memory will be required to hold 2 s of data if the signal from the sensor is changing rapidly.

Hence, during normal driving of the vehicle, a rolling 2 s window of data from the accelerometers is continually stored in a compact and efficient manner.

When a determination is made that the vehicle is involved in an accident or crash situation (or that the vehicle is likely to be involved in such a situation, or is likely to enter into such a situation) the data from the accelerometers is still recorded in the memory using a compression technique of the kind discussed above. However, data is no longer deleted from the memory, and new data is recorded in the memory to be added to all of the existing data which is already stored in the memory. In this way, once the crash has finished, the vehicle's memory may store accelerometer data from 2 s before the moment when it was determined that the crash was taking place, through the crash until after the crash had finished. This should provide an investigator with all of the relevant data to analyse the crash event.

In preferred embodiments, if a determination is made that the vehicle is likely to be involved in, or likely to enter into, a crash situation, accelerometer data may be recorded without any existing data being deleted. However, if the vehicle is ultimately not involved in a crash, older data may be deleted and the system may return to its normal operation of storing a rolling window of data. For instance, the vehicle's processor may provide a signal, or change the value of a flag, when it is determined that a crash situation may occur. While this is the case, no stored accelerometer data may be deleted. When the signal is changed, or the flag value is returned to normal, older data is deleted. As an alternative, a certain length of time (say, 30 seconds) after first receiving a signal that a crash event is likely, if no crash event has occurred then the system may assume that the crash event did not happen, and revert to normal operation.

The above techniques provide an efficient and effective manner or compressing related streams of data, one of which represents a "floating" variable which may take any value within a relatively wide range, and one of which may only take a more restricted range of values, in particular a flag or true/false indicator which may only take one of two different values. The invention finds particular utility in encoding and storing data produced by one or more accelerometers on board a vehicle, which produces a value of acceleration and a corresponding value showing whether the acceleration value is deemed to be valid.

Data from sources other than accelerometers may also be encoded, however. Examples of other data which could effectively be encoded in this manner include:

data representing the angle through which a steering wheel is turned, or the amount by which a vehicle pedal is pressed, along with a corresponding validation flag;

data encoding the forward speed of a vehicle, along with a corresponding validation flag; or data representing the rate at which a drive shaft of the engine of the vehicle, or a wheel of the vehicle, is rotating, along with a corresponding validation flag.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the above description constitutes the preferred embodiment of the present invention, it will be appreciated that the invention is susceptible to modification, variation and change without departing from the proper scope and fair meaning of the accompanying claims.

The invention claimed is:

1. A method of storing data relating to a parameter of a vehicle, wherein the data is provided by a vehicle sensor, the method comprising the steps of:
   receiving, at time intervals, a series of first and second values from the vehicle sensor, wherein each of the first value represents the parameter that is sensed by the vehicle sensor, and each of the second values relates to functioning of the vehicle sensor;
   for each of the first values that is received comprising a new first value:
      comparing the new first value to an immediately preceding first value that was received;
      if a difference between the new first value and the immediately preceding first value is below a first difference threshold, storing the difference in a memory; or
      if the difference between the new first value and the immediately preceding first value is above a second difference threshold, storing the new first value in the memory,
   maintaining a counter recording the number of consecutive of the second values that have been received that have had the same value; and
   for each second values that is received comprising a new second value:
      comparing the new second value to an immediately preceding second value that was received;
      if the new second value is the same as the immediately preceding second value, incrementing the counter; or
      if the new second value is different from the immediately preceding second value, recording a single bit representing the immediately preceding second value in the memory, along with a current counter value in a data field with the single bit representing the immediately preceding second value, and then resetting the counter; and if the counter has reached a counter threshold value, recording another single bit representing the new second value in the memory, along with the counter threshold value in another data field with the single bit representing the new second value, and resetting the counter, wherein each of the second values has one of: a validity flag value representing the vehicle sensor being functional, or a different value representing the vehicle sensor being non-functional.

2. The method according to claim 1, wherein:

the step of storing the difference between the new first value and the immediately preceding first value comprises storing a data word having a first length;

the step of storing the new first value comprises storing a data word having a second length; and the first length is less than the second length.

3. The method according to claim 1, wherein the step of storing the new first value comprises storing a data word including one or more bits that indicate that the data word includes the new first value.

4. The method according to claim 1, wherein the step of storing the difference between the new first value and the immediately preceding first value comprises storing a data word including one or more bits that indicate that the data word includes the difference between two consecutive first values.

5. The method according to claim 3, wherein the one or more bits comprise a header which appears at the start of the data word.

6. The method according to claim 1, further comprising the step of recording timestamp data indicating the time at which the data relating to the parameter of the vehicle has been stored, and further comprising the step of recording separate timestamp data in connection with the first values and in connection with the second values.

7. The method according to claim 1, further comprising the steps of:

recording timestamp data at periodic intervals in connection with the second values; and if, following an interval since the recording of a previous timestamp data, the counter is in the course of incrementing, waiting until data relating to the second values is recorded before recording the timestamp data in connection with the second values.

8. The method according to claim 1, further comprising the steps of receiving from the vehicle sensor a data package comprising the new first value and the new second value; and separating the new first value and the new second value.

9. The method according to claim 1, wherein: recording the immediately preceding second value in the memory, along with the current counter value, comprises storing a data word in the memory including the immediately preceding second value and the current counter value; and wherein recording the new second value in the memory, along with the counter threshold value, comprises storing a data word in the memory including the new second value and the counter threshold value.

10. The method according to claim 1, further comprising recording the first and second values in the memory of the vehicle and storing the first and the second values relating to a set time period immediately preceding a present moment, and over-writing the first and the second values relating to times which are more than the set time period before the present moment.

11. A non-transitory computer-readable storage medium storing program code operable to perform all of the steps of claim 1 when the program code is run on a computer.

12. A vehicle having a vehicle sensor which, in use, generates a series of first and second values from the vehicle sensor, wherein each of the first values represents a parameter that is sensed by the vehicle sensor, and each of the second values relate to the functioning of the vehicle sensor, wherein the first and the second values are transmitted from the vehicle sensor to a vehicle processor, and stored in a memory of the vehicle the processor, and wherein the vehicle processor is configured for:

receiving, at time intervals, a series of first and second values from the vehicle sensor, wherein each of the first value represents the parameter that is sensed by the vehicle sensor, and each of the second value relates to functioning of the vehicle sensor;

for each of the first values that is received comprising a new first value:

comparing the new first value to an immediately preceding first value that was received;

if a difference between the new first value and the immediately preceding first value is below a first difference threshold, storing the difference in the memory; or if a difference between the new first value and the immediately preceding first value is above a second difference threshold, storing the new first value in the memory, maintaining a counter recording the number of consecutive of the second values that have been received that have had the same value; and for each second values that is received comprising a new second value:

comparing the new second value to an immediately preceding second value that was received;

if the new second value is the same as the immediately preceding second value, incrementing the counter; or if the new second value is different from the immediately preceding second value, recording a single bit representing the immediately preceding second value in the memory, along with a current counter value in a data field with the single bit representing the immediately preceding second value, and then resetting the counter; and if the counter has reached a counter threshold value, recording another single bit representing the new second value in the memory, along with the counter threshold value in another data field with the single bit representing the new second value, and resetting the counter, wherein each of the second values has one of: a validity flag value representing the vehicle sensor being functional, or a different value representing the vehicle sensor being non-functional.

13. The vehicle according to claim 12, wherein the series of the first and the second values comprises a series of linked first and second values.

14. The vehicle according to claim 12, wherein the sensor is an accelerometer, and the sensors.

* * * * *